United States Patent [19]

Morishima et al.

[11] Patent Number: 5,668,872
[45] Date of Patent: Sep. 16, 1997

[54] INFORMATION PROCESSING METHOD AND SYSTEM

[75] Inventors: Hideki Morishima, Atsugi; Kiyonobu Endo, Yokohama; Susumu Matsumura, Kawaguchi; Hiroaki Hoshi, Yokohama; Koyo Hasegawa, Tokyo; Masakuni Yamamoto, Yamato; Eiji Yamaguchi, Zama; Ichiro Iida, Tokyo, all of Japan

[73] Assignee: Canon Kabushiki Kaisha, Tokyo, Japan

[21] Appl. No.: 385,374

[22] Filed: Feb. 7, 1995

Related U.S. Application Data

[63] Continuation of Ser. No. 964,261, Oct. 21, 1992, abandoned.

[30] Foreign Application Priority Data

Oct. 25, 1991 [JP] Japan .................. 3-305705

[51] Int. Cl.$^6$ ................ H04N 7/167; G11B 5/02
[52] U.S. Cl. ................. 380/4; 380/16; 380/25; 360/27; 369/47
[58] Field of Search ............ 380/3–5, 22; 360/60, 360/27; 369/47, 48

[56] References Cited

U.S. PATENT DOCUMENTS

| | | | |
|---|---|---|---|
| 4,595,950 | 6/1986 | Lofberg | 380/5 |
| 4,644,493 | 2/1987 | Chandra et al. | 380/22 X |
| 4,807,286 | 2/1989 | Wiedemer | 380/16 |
| 4,908,834 | 3/1990 | Wiedemer | 380/5 |
| 4,916,737 | 4/1990 | Chomet et al. | 380/20 |
| 4,965,680 | 10/1990 | Endow | 360/60 |
| 4,991,208 | 2/1991 | Walker et al. | 380/20 |
| 5,003,590 | 3/1991 | Lechner et al. | 380/5 |
| 5,027,396 | 6/1991 | Platteter et al. | 380/4 |
| 5,097,504 | 3/1992 | Camion et al. | 380/22 X |
| 5,144,663 | 9/1992 | Kudelski et al. | 380/16 |
| 5,379,433 | 1/1995 | Yamagishi | 380/4 X |

FOREIGN PATENT DOCUMENTS 0243312  10/1987  European Pat. Off. .

OTHER PUBLICATIONS

Patent Abstracts of Japan, Kokai No. 01–012783, vol. 13, No. 192, May 1989.

*Primary Examiner*—Gilberto Barrón, Jr.
*Attorney, Agent, or Firm*—Fitzpatrick, Cella, Harper & Scinto

[57] ABSTRACT

An information processing method and system in which coded or incomplete information is transmitted through a space or through a predetermined transmission line and is received by a user. A program or data needed to demodulate the information is read out from a recording medium, and the received information is demodulated using the read out program or data.

19 Claims, 8 Drawing Sheets

| b7 | | | 0 | 0 | 1 | 1 | 1 | 1 |
|----|----|----|---|---|---|---|---|---|
| b6 | | | 1 | 1 | 0 | 0 | 1 | 1 |
| b5 | | | 0 | 1 | 0 | 1 | 0 | 1 |
| b4 | b3 | b2 | b1 | | 2 | 3 | 4 | 5 | 6 | 7 |
| 0 | 0 | 0 | 0 | 0 | | 0 | @ | P | ` | p |
| 0 | 0 | 0 | 1 | 1 | ! | 1 | A | Q | a | q |
| 0 | 0 | 1 | 0 | 2 | " | 2 | B | R | b | r |
| 0 | 0 | 1 | 1 | 3 | # | 3 | C | S | c | s |
| 0 | 1 | 0 | 0 | 4 | $ | 4 | D | T | d | t |
| 0 | 1 | 0 | 1 | 5 | % | 5 | E | U | e | u |
| 0 | 1 | 1 | 0 | 6 | & | 6 | F | V | f | v |
| 0 | 1 | 1 | 1 | 7 | ' | 7 | G | W | g | w |
| 1 | 0 | 0 | 0 | 8 | ( | 8 | H | X | h | x |
| 1 | 0 | 0 | 1 | 9 | ) | 9 | I | Y | i | y |
| 1 | 0 | 1 | 0 | A | * | : | J | Z | j | z |
| 1 | 0 | 1 | 1 | B | + | ; | K | [ | k | ( |
| 1 | 1 | 0 | 0 | C | , | < | L | ¥ | l | l |
| 1 | 1 | 0 | 1 | D | — | = | M | ] | m | ) |
| 1 | 1 | 1 | 0 | E | . | > | N | ^ | n | — |
| 1 | 1 | 1 | 1 | F | / | ? | O | _ | o | |

FIG. 5A

| b7 | 0 | 0 | 1 | 1 | 1 | 1 |
|---|---|---|---|---|---|---|
| b6 | 1 | 1 | 0 | 0 | 1 | 1 |
| b5 | 0 | 1 | 0 | 1 | 0 | 1 |

| b4 | b3 | b2 | b1 | | 2 | 3 | 4 | 5 | 6 | 7 |
|---|---|---|---|---|---|---|---|---|---|---|
| 0 | 0 | 0 | 0 | 0 |  | ぐ | だ | ば | む | ゐ |
| 0 | 0 | 0 | 1 | 1 | ぁ | け | ち | ぱ | め | ゑ |
| 0 | 0 | 1 | 0 | 2 | あ | げ | ぢ | ひ | も | を |
| 0 | 0 | 1 | 1 | 3 | ぃ | こ | っ | び | ゃ | ん |
| 0 | 1 | 0 | 0 | 4 | い | ご | つ | ぴ | や |  |
| 0 | 1 | 0 | 1 | 5 | ぅ | さ | づ | ふ | ゅ |  |
| 0 | 1 | 1 | 0 | 6 | う | ざ | て | ぶ | ゆ |  |
| 0 | 1 | 1 | 1 | 7 | ぇ | し | で | ぷ | ょ | ゛ |
| 1 | 0 | 0 | 0 | 8 | え | じ | と | へ | よ | ゜ |
| 1 | 0 | 0 | 1 | 9 | ぉ | す | ど | べ | ら | ー |
| 1 | 0 | 1 | 0 | A | お | ず | な | ぺ | り | 。 |
| 1 | 0 | 1 | 1 | B | か | せ | に | ほ | る | 「 |
| 1 | 1 | 0 | 0 | C | が | ぜ | ぬ | ぼ | れ | 」 |
| 1 | 1 | 0 | 1 | D | き | そ | ね | ぽ | ろ | 、 |
| 1 | 1 | 1 | 0 | E | ぎ | ぞ | の | ま | ゎ | ･ |
| 1 | 1 | 1 | 1 | F | く | た | は | み | わ |  |

} PORTION WHEREIN ARRANGEMENT IS DIFFERENT FROM JIS CHARACTER CODE

FIG.5B

| b7 | | 0 | 0 | 1 | 1 | 1 | 1 |
|---|---|---|---|---|---|---|---|
| b6 | | 1 | 1 | 0 | 0 | 1 | 1 |
| b5 | | 0 | 1 | 0 | 1 | 0 | 1 |
| b1 b2 b3 b4 | | 2 | 3 | 4 | 5 | 6 | 7 |
| 0 0 0 0 | 0 | ▨ | グ | ダ | バ | ム | キ |
| 0 0 0 1 | 1 | ア | ケ | チ | パ | メ | エ |
| 0 0 1 0 | 2 | ア | ゲ | ヂ | ヒ | モ | ヲ |
| 0 0 1 1 | 3 | イ | コ | ッ | ビ | ャ | ン |
| 0 1 0 0 | 4 | イ | ゴ | ツ | ピ | ヤ | ヴ |
| 0 1 0 1 | 5 | ウ | サ | ヅ | フ | ュ | カ |
| 0 1 1 0 | 6 | ウ | ザ | テ | ブ | ユ | ケ |
| 0 1 1 1 | 7 | エ | シ | デ | プ | ヨ | ゛ |
| 1 0 0 0 | 8 | エ | ジ | ト | ヘ | ヨ | ゜ |
| 1 0 0 1 | 9 | オ | ス | ド | ベ | ラ | ー |
| 1 0 1 0 | A | オ | ズ | ナ | ペ | リ | 。 |
| 1 0 1 1 | B | カ | セ | ニ | ホ | ル | 「 |
| 1 1 0 0 | C | ガ | ゼ | ヌ | ボ | レ | 」 |
| 1 1 0 1 | D | キ | ソ | ネ | ポ | ロ | 、 |
| 1 1 1 0 | E | ギ | ゾ | ノ | マ | ヮ | · |
| 1 1 1 1 | F | ク | タ | ハ | ミ | ワ | |

} PORTION WHEREIN ARRANGEMENT IS DIFFERENT FROM JIS CHARACTER CODE

INFORMATION PROCESSING METHOD AND SYSTEM

This application is a continuation of prior application, Ser. No. 07/964,261 filed Oct. 21, 1992, now abandoned.

BACKGROUND OF THE INVENTION

1. Field of the Invention

The present invention relates to information processing methods and systems, and in particular, to a method of limiting the use of information transmitted to a large number of unspecified people solely to a specific user, and a system utilizing such a method. The present invention is very useful in a case where a charge is to be made for information supplied through a communication system.

2. Related Background Art

Presently, the transmission of information using an electromagnetic wave is widely employed, and a telephone and so forth are used as a one-to-one information transmission means. Television, radio and the like are known as unidirectional information transmission means in which information is transmitted from an information transmission source to a large number of unspecified users having individual receivers. In the case of a telecast, a charge for information transmitted to each of the unspecified users is conducted, for example, by collecting a TV reception rate from users having TV receivers by Nippon Hoso Kyokai (NHK) or the Japan Broadcast Association. Further, a charge-based broadcast satellite (BS) broadcast has recently been started by Nippon Eisei Hoso (Japan BS Broadcast) Co., and a charge for this BS broadcast is conducted by using a BS decoder.

FIG. 1 shows a block diagram of an example of the BS decoder. In FIG. 1, a work key (Kw), individual information such as conditions of a reception contract and a master key (Kmi) are stored in a BS decoder 38 which is loaned to a user having a reception contract. In FIG. 1, an initially scrambled (coded or ciphered) video signal is supplied from a BS tuner (not shown) to a video descrambler 37. In addition, a signal comprising information needed for decoding (hereinafter referred to as related information) superimposed on a scrambled audio signal is supplied to a separation circuit 30, and the scrambled audio signal and the related information are separated from each other. The related information is further separated into common information and individual information. The common information consists of a scramble key (Ks) needed to decode the broadcast signal, and contract information, which comprises broadcast station identification information, service contents and so forth, all of which are coded. The separated common information is decoded in a decoding circuit 31, using a work key Kw which is recorded in the BS decoder 38. The contract information is supplied to a contract condition comparison circuit 34 and compared with the contract contents stored in the decoder 38.

On the other hand, a scramble key Ks, which is decoded by the decoding circuit 31, is supplied to a pseudo-random number (PN) generator 35, and the PN generator 35 generates a pseudo-random number signal (PN signal) which has an initial value of Ks when the comparison in the contract condition comparison circuit 34 is satisfied. The PN signal is supplied to an audio descrambler 36 and the video descrambler 37, and the audio and vide signals are respectively decoded using the PN signal.

The individual information is coded information to be used when the contract condition is altered and to be decoded in a decoding circuit 32 using a master key Kmi 33 to re-write the contract condition recorded in the contract condition comparison circuit 34. Thus, the scrambled (coded) video and audio signals are decoded, and only a contractor can receive a broadcast picture image. As a result, the charge is conducted only for the contractor of the BS broadcast, and a change of the contract condition can be performed by the broadcast.

In the prior art pay BS broadcast, however, a charge is conducted for the use of a device of the BS decoder 38 lent to the contractor, and no charge is made for respective groups of information. That is, in the prior art technique, no charge can be conducted individually for respective groups of information, and so it is difficult to make a charge for the particular information received.

SUMMARY OF THE INVENTION

It is an object of the present invention to provide a method of permitting the use of information only to a specific user per an information unit and a system to be used in such a method.

In a method for achieving the object of the present invention, information transmitted through space or through a predetermined transmission line, which is coded or incomplete, is received, program or data (decoding information), needed to demodulate the information, is read from a recording medium and the received information is demodulated using the decoding information read from the recording medium to convert the received information to a usable form.

In an information processing system for achieving the object of the present invention, there are arranged receiving means for receiving information transmitted through space or through a predetermined transmission line, which is coded or incomplete, a recording medium in which a program or data, needed to demodulate the information, is recorded, reading means for reading out the program or data from the recording medium and demodulating means for demodulating the information received by the receiving means using the program or data read out by the reading means.

In a method of distributing information, to which the present invention may be applied, a plurality of groups of information which are respectively coded in different systems are transmitted to a user, and a plurality of kinds of recording media respectively corresponding to the plurality of groups of information, in which programs or data needed to demodulate the respective groups of information are respectively recorded, are distributed. Here, a user who possesses one of the recording media reads out the program or data recorded in this recording medium and demodulates the group of information corresponding to this recording medium using the read out program or data.

According to another aspect of the present invention, an information processing system is provided which includes a host computer for providing coded software, a first modem for transmitting the software through a telephone line and a second modem for receiving the software transmitted through the telephone line. The system further includes a recording medium with a program or data (decoding information) needed to demodulate the coded software being recorded in the recording medium, a driving unit for reading out the decoding information and a personal computer for demodulating the software received by the second modem by using the program or data read out by the driving unit.

According to yet another aspect of the present invention, an information processing method is provided which includes the steps of receiving coded software from a host computer through a telephone line, reading out a program or data (decoding information) needed to demodulate the coded software from a recording medium and demodulating the received software by using the read out program or data.

According to still another aspect of the present invention, a system for receiving a coded broadcast signal is provided which includes a receiving circuit for receiving a coded broadcast signal and a recording medium, with software needed to demodulate the coded broadcast signal being recorded in the recording medium. A driving unit is provided for reading out the software from the recording medium, and a processing circuit is provided for demodulating the broadcast signal received by the receiving circuit using the software read out by the driving unit.

According to yet another aspect of the present invention, a method for receiving a coded broadcast signal is provided which includes the steps of receiving a coded broadcast signal, reading out software needed to demodulate the coded broadcast signal from a recording medium and demodulating the received broadcast signal using the read out software.

These advantages and others will be more readily understood in connection with the following detailed description of the preferred embodiments in conjunction with the drawings.

BRIEF DESCRIPTION OF THE DRAWINGS

FIGS. 5A-5D are respectively schematic views illustrating examples of a character code to be used for demodulating a letter or character broadcast program.

DESCRIPTION OF THE PREFERRED EMBODIMENT

Preferred embodiments of the present invention will be explained with reference to the drawings.

Figure 1:
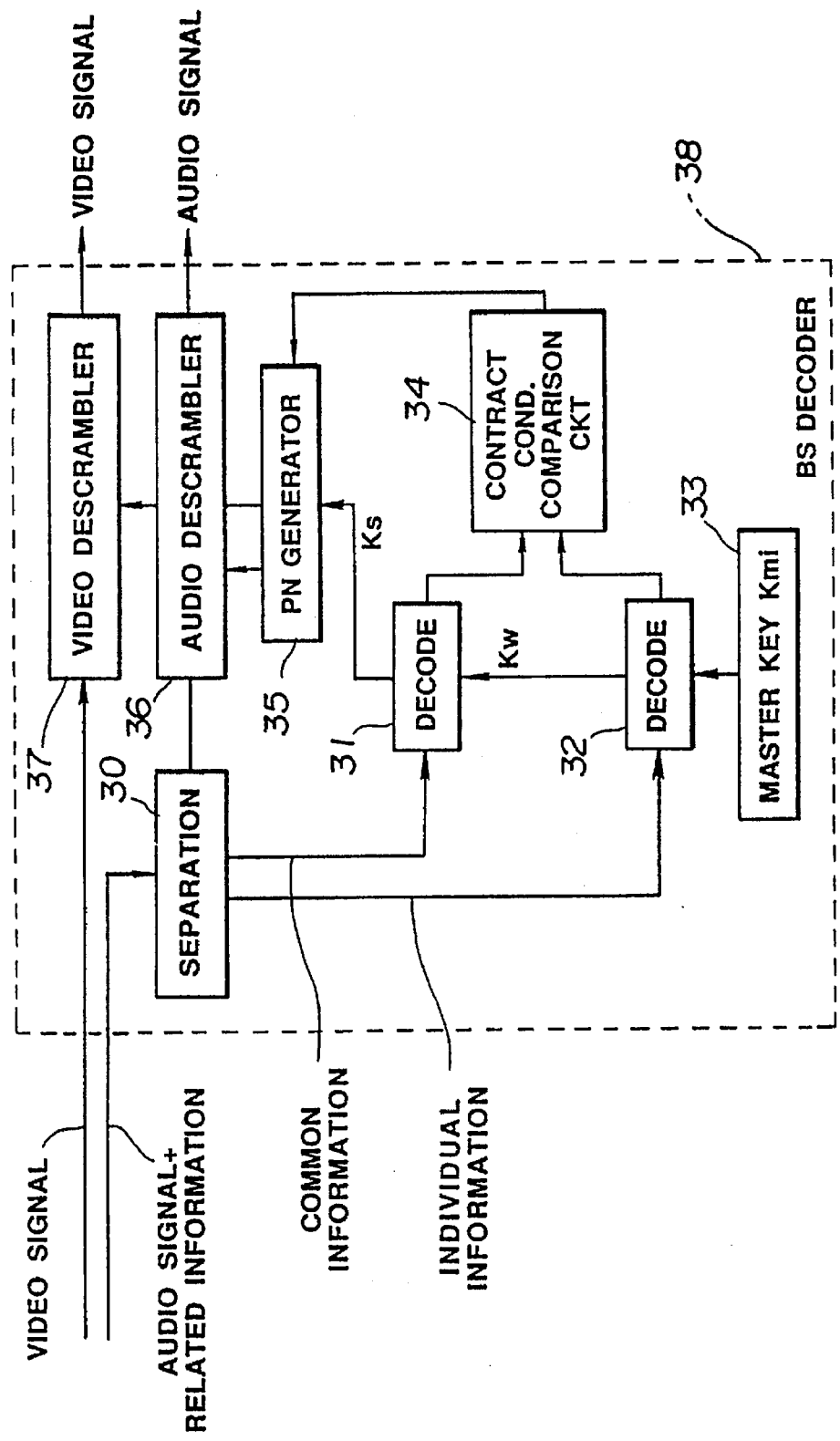
FIG. 1 is a block diagram showing an example of a prior art BS decoder.
Figure 2:
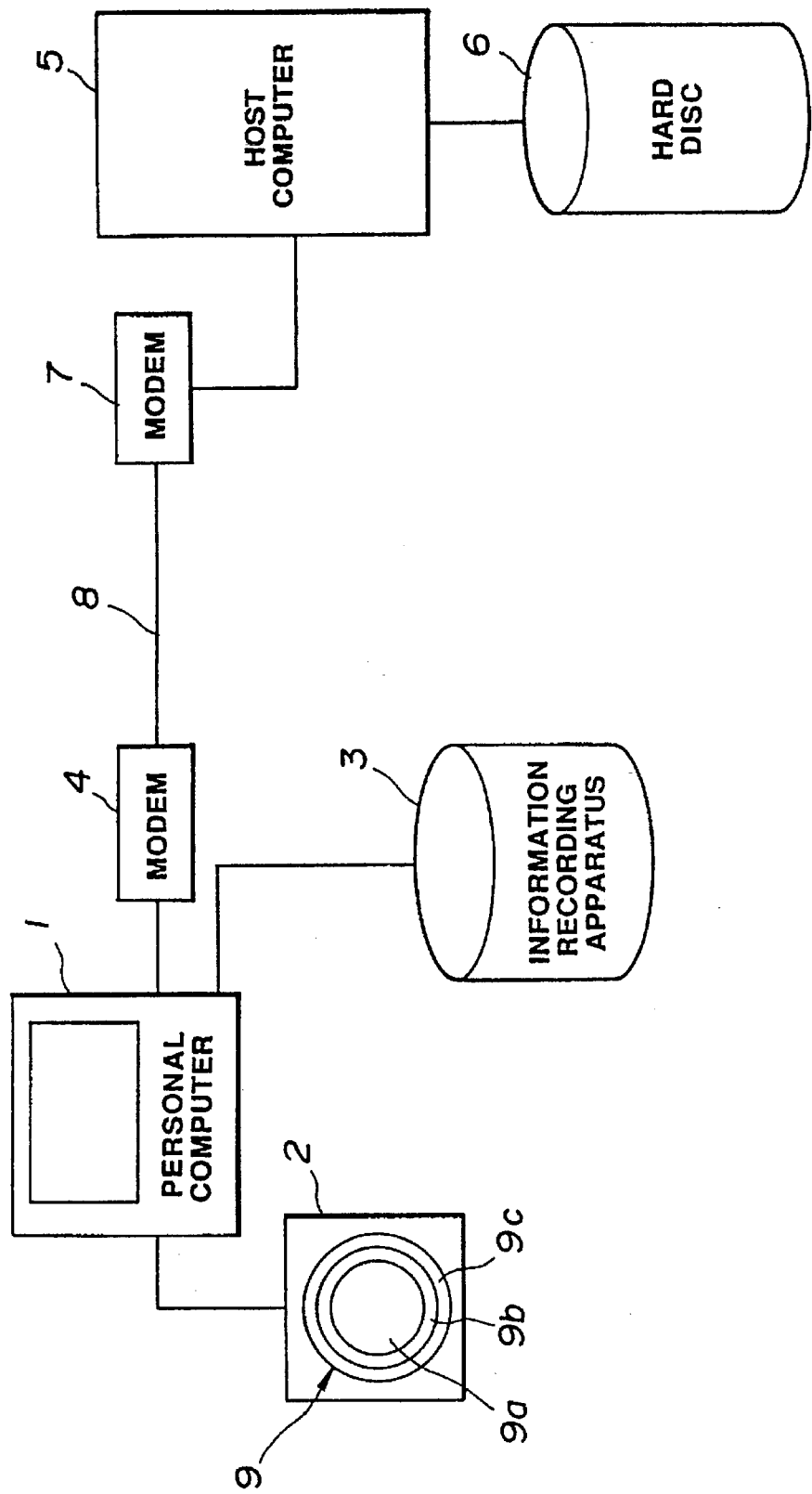
FIG. 2 is a block diagram showing an embodiment of the present invention applied to a computer communication system.

FIG. 2 is a block diagram showing an embodiment of an information processing apparatus for charging for information according to the present invention wherein the present invention is applied to an information communication system for performing distribution and renewal of software by a so-called computer communication using a telephone line. In FIG. 2, reference numeral 1 designates a personal computer at the side of a user, reference numeral 2 designates a magneto-optical disc driving device (hereinafter referred to as an MOD driver), and reference numeral 3 designates an information recording apparatus such as a hard disc. The personal computer 1 is connected to the MOD driver 2, the information recording apparatus 3 and a modem 4. Further, reference numeral 5 designates a host computer at the side of a place from which software is to be distributed, and the host computer 5 is connected to a hard disc 6 of a large capacity and a modem 7. The host computer 5 supplies and receives data to and from the personal computer 1 through a telephone line 8, and the distribution and renewal of the software for the personal computer 1 are also performed through the telephone line 8. Reference numeral 9 designates a magneto-optical disc loaded in the MOD driver 2, and this disc 9 is made by the distributor of software. A recording area of the magneto-optical disc 9 is divided into a recording area 9a, a management area 9b and a read only memory (ROM) area 9c. Software for communicating with the host computer 5, software for accessing coded software in the hard disc 6, which is specified by the software distributor, and copying this specified software into the recording area 9a of the magneto-optical disc 9, software (decoding information) for decoding (demodulating) the software copied into this recording area 9a and a management program are recorded in the ROM area 9c.

The operation of this embodiment will be described. The magneto-optical disc 9 is initially loaded in the MOD driver 2, and the personal computer 1 is started. As a result, a boot program in the ROM area 9c is initiated. The user accesses the host computer 5, and selects either copying of the above-mentioned coded software from the hard disc 6 or use of the software copied in the recording area 9a. When the software is to be copied from the host computer 5, the copying of the software will be performed in the following manner.

In the first place, the communication program with the host computer 5 stored in the ROM area 9c is initiated. In this case, data needed to communicate with the host computer 5, such as a password, is stored in the ROM area 9c, and this data is transmitted to the host computer 5. The host computer 5 determines whether the communication with the personal computer 1 should be conducted or not, based on the transmitted data. When the communication between the host computer 5 and the personal computer 1 thus becomes possible, a request for copying the software and data needed to copy such software are supplied from the personal computer 1 to the host computer 5. The host computer 5 determines whether the software may be transmitted to the personal computer 1 by referring to the data, and upon determining that the transmission may be permitted, the host computer 5 transmits the coded (or incomplete) software stored in the hard disc 6 to the personal computer 1. The personal computer 1 instructs the MOD driver 2 to cause the magneto-optical disc 9 to copy the transmitted software into the recording area 9a. After the completion of the transmission and copying of the software, the host computer 5 performs the verification between the software copied in the recording area 9a and the software in the hard disc 6 through the telephone line 8. When an accurate copy is confirmed, a name of the software, its version, and time and date of the copy are written in the management area 9b, and the communication with the personal computer 1 is finished.

On the other hand, when the user is to initiate execution of the software copied into the recording area 9a in the above-discussed manner, the following processing will be performed. When the software is first initiated, the software is decoded (demodulated) by initiating a decode program in the ROM area 9c since the copied software in the recording area 9a is coded (or incomplete). The software converted to usable form is again recorded in the recording area 9a, and at the same time, the management data such as time and date at which the software is decoded, and a file name of the decoded software are written in the management area 9b. In this case, the coded (or incomplete) software in the recording area 9a may be erased or may be preserved as it is. Thus, the coded software first becomes usable, and the user can use this by initiating the software recorded in the recording area 9a. When the software is to be used a second or later time, the software recorded in the recording area 9a may be used as it is since the software has already been decoded (demodulated). The software converted to usable form may be recorded in the information recording apparatus 3 connected to the personal computer 1 and may be used from there.

In this embodiment, the decode program for decoding the coded software is recorded in the magneto-optical disc 9, and as a result the user can decode the transmitted software and use it. Therefore, if the distributor of software sells the magneto-optical disc 9 at a price including a use rate of the software when he produces and sells the magneto-optical disc 1, the distributor can charge for the software. Although the software is exemplified as information for which a charge is made in this embodiment, the information may be other data. When the software is to be somewhat revised, e.g., correction and version-upgrade of the software, revised software is distributed to achieve such revision, without using new media for distribution. Further, the program or data (decoding information) needed to copy or decode the software to be recorded in the ROM area 9c of the magneto-optical disc 9 is recorded in a so-called pit structure having an uneven structure but not in a form of a magnetic domain which is usually utilized in a magneto-optical disc. For example, the program or data (decoding information) may be recorded by simultaneous molding, when a disc substrate (this includes a groove structure, track number information, sector number information, etc.) is molded using a metallic mold at the manufacture of the magneto-optical disc.

Figure 3:
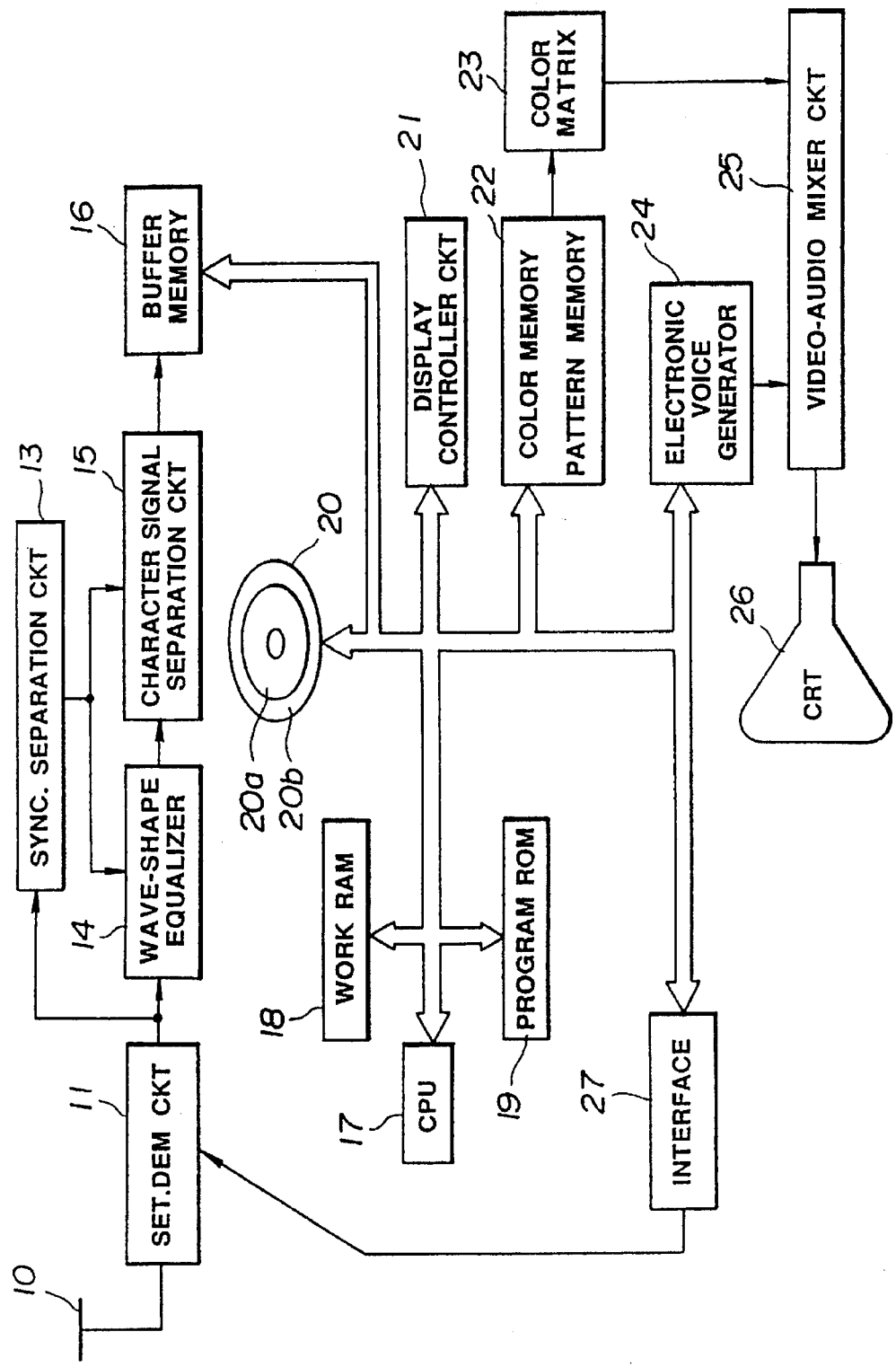
FIG. 3 is a block diagram showing an embodiment of the present invention applied to a receiving system of a letter or character multiplexing broadcast.

FIG. 3 is a block diagram showing another embodiment of the present invention applied to a letter or character multiplexing broadcast. In this embodiment, it is assumed that a coded character broadcasting program for a specific user as well as a normal or ordinary character broadcast program for a large number of unspecified users are combined in a single broadcast, and that the coded character broadcast program can be offered exclusively to the specific user. In FIG. 3, reference numeral 10 designates an antenna for receiving electric waves broadcast from a broadcasting station, and reference numeral 11 designates a selection-demodulation circuit for selecting a channel designated by the user and demodulating a video signal of the selected channel. The demodulated video signal is supplied to a synchronization separation circuit 13, and horizontal and vertical synchronizing signals are separated from the video signal and at the same time a reference clock for wave-shape equalization and character signal separation is generated from the video signal. Further, reference numeral 14 designates a wave-shape equalizer circuit for shaping the wave-shape of the video signal with reference to the reference clock, reference numeral 15 designates a character signal separation circuit for separating a character signal from the video signal whose wave-shape is shaped by the wave-shape equalizer circuit 14 with reference to the reference clock, and reference numeral 16 designates a buffer memory for storing program data of the character broadcast obtained in the character signal separation circuit 15. The program data stored in the buffer memory 16 is demodulated to be displayed on CRT 26 after a determination that the program data may be used is confirmed using its identification code. A detailed explanation of this operation will be made below.

Further, reference numeral 17 designates a central processing unit (CPU) for controlling each part, reference numeral 18 designates a work random access memory (RAM), and reference numeral 19 designates a program ROM, and reference numeral 20 designates a magneto-optical disc. A magneto-optical disc driver apparatus (not shown) records and reproduces information in and from the magneto-optical disc 20, and its recording area is divided into a program recording area 20a and a ROM area 20b. The program recording area 20a includes a program recording table in which a set of time and date of program recording and a content change flag are to be recorded. In the ROM area 20b, an identification of the coded character broadcast program (more concretely, coded program channel, scan interval of transmission, transmission mode and program number) and software (decoding information) needed to demodulate the coded (or incomplete) character broadcast program are recorded. Coding of the broadcast program data is performed by, for example, using a character code different from a normal character broadcast. In such a case, the demodulation software in the ROM area 20b consists of a program for transforming the character code into a normal character code and character code data.

Figure 4:
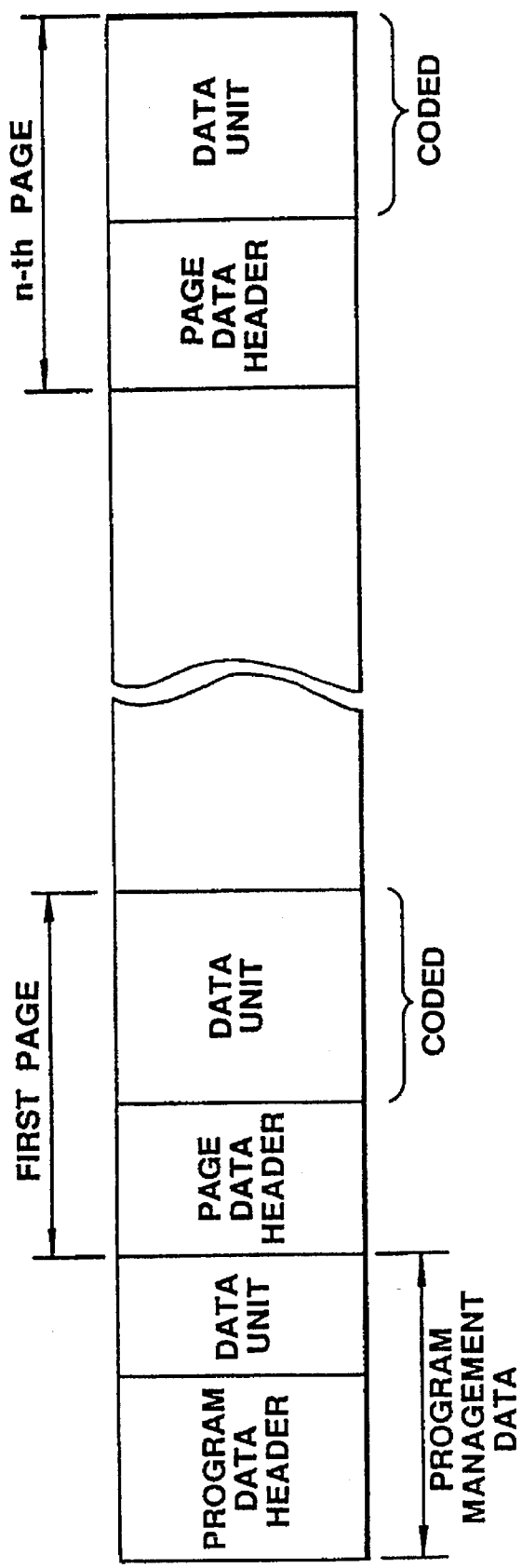
FIG. 4 is a schematic view showing a data structure of a coded letter or character broadcast program.
Figure 5D:
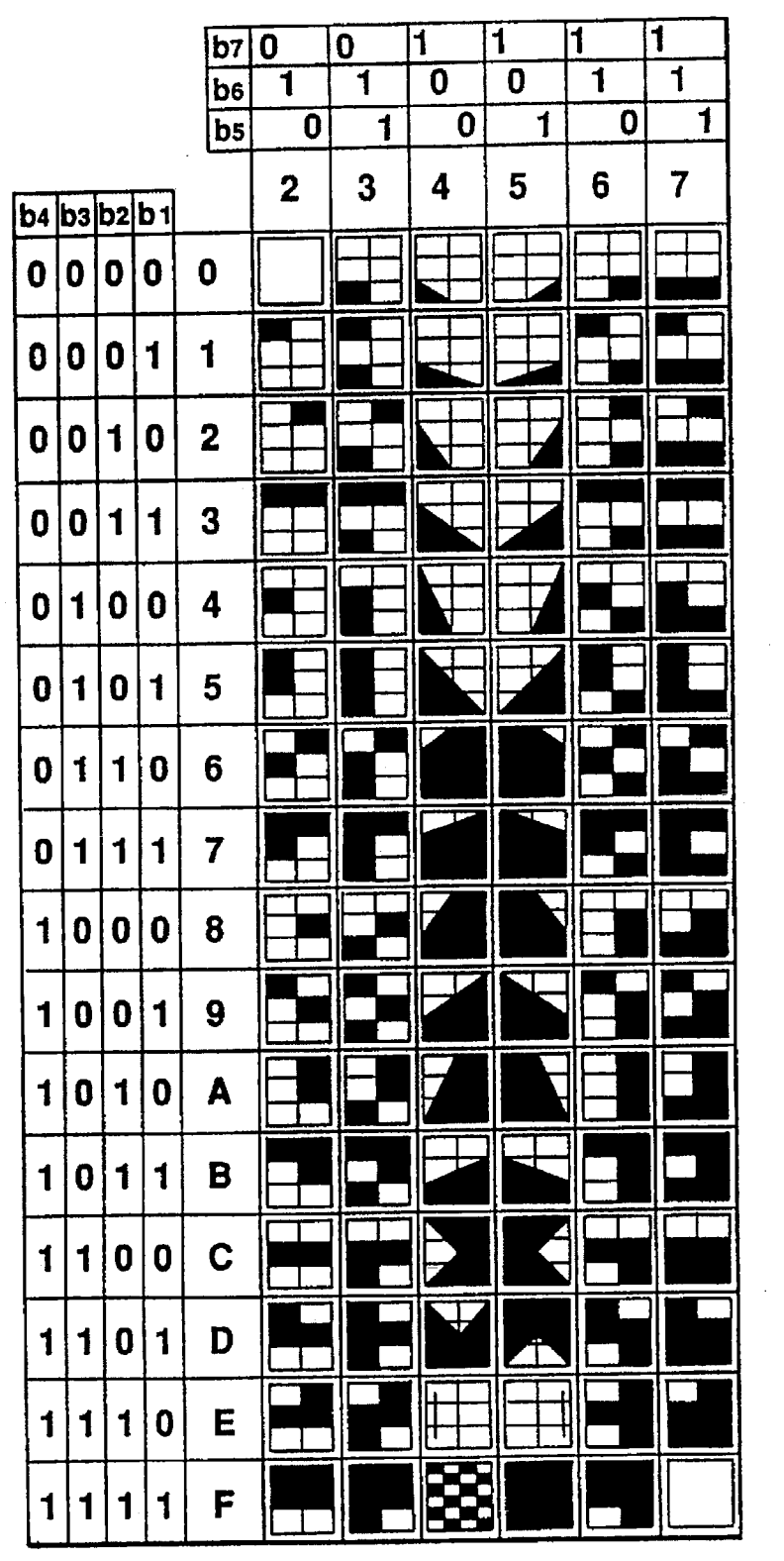

FIG. 4 is a view showing the data structure of a coded (or incomplete) character broadcast program. As is seen from FIG. 4, a program header and a page header of each page are written with the same code as that of an ordinary character broadcast program, and only a unit data of each page (net program information) is coded. FIGS. 5A–5D respectively show examples of character code sets (character codes) to be used as decoding information to demodulate an ordinary character broadcast program and convert the broadcast information to usable form. In this embodiment, only the character code sets of the character broadcast signal are used solely for the coded broadcast program, without using character code for an ordinary character broadcast program illustrated in FIGS. 5A–5D. Therefore, if demodulation of the coded program is attempted using data in the ordinary program ROM 19, the demodulation could not be performed normally because no characters exist corresponding to the code or only different characters exist corresponding to the code. As discussed above, only a specified user can demodulate the coded letter broadcast, and as a result the broadcast is limited to the specified user.

The operation of this embodiment will be described hereinbelow.

Initially, when the letter broadcast data is stored in the buffer memory 16 up to a decode unit, CPU 17 compares the identification code attached to the character broadcast program with the identification code in the ROM area 20b and performs the following control when both of them are coincident with each other. In the first place, the time and date of program recording and the content change flag in the program recording table of the program recording area 20a are compared with the content change flag of the character broadcast program data and present time and data in the buffer memory 16. Only when the two content change flags are coincident with each other and the time and date of program recording does not exceed a time input beforehand (for example, twenty minutes), the program data in the buffer memory 16 is recorded in the program recording area of the magneto-optical disc 20. Namely, the content of the letter broadcast program may be changed, and in this case the presence of a change in the content of the program is usually known from the content change flag. When the recording time and date of the previously recorded program data and the content change flag at that time are coincident with the present time and date and content change flag as a result of the comparison and the recording time and date do not exceed a predetermined time, the program data in the buffer memory 16 is judged to be the latest data. Therefore, in the other cases, the program data is judged to be old and the program data in the buffer memory 16 is erased. When the latest program data is recorded in the program recording area 20a, the content change flag and recording time and date at that time are recorded in the program recording table. As a result, when the program data is to be used the next time, the latest program data can be obtained following the same operation as discussed above.

The program data recorded in the program recording area 20a is thus read out by the CPU 17, and the demodulation processing is performed. In the demodulation processing, the program and character code data (decoding data) recorded in the ROM area 20b of the magneto-optical disc 20 are read out by the magneto-optical disc driver apparatus, and the CPU 17 demodulates the coded (or incomplete) program data using that program and data (decoding information). The demodulated data is finally developed on a color matrix (picture image memory) 23 by the CPU 17, and is displayed on the image surface of a cathode ray tube (CRT) 26. When voice is involved in the program data, the audio data is transformed into voice by an electronic voice generator 24, and the video image and audio voice are mixed by a video-audio mixer circuit 25 to be displayed by the CRT 26. The character code data in the ROM area 20b has a capacity of 2-3 Mbyte approximately equal to that of the program ROM used in a conventional character broadcast, and its content consists of a transformation list and a program for transforming (converting) the character code set (character code) used in the coded program into an ordinary character code set so that the program is in usable form. In FIG. 3, reference numeral 21 designates a display control circuit, reference numeral 22 designates color memory and pattern memory and reference numeral 27 designates an interface.

On the other hand, when the identification code of the program data in the buffer memory 16 is not coincident with the identification code of the coded (or incomplete) character broadcast program in the ROM area 20b, the CPU 17 does not perform the recording of the program data into the program recording area 20a, and the use of the program data is prohibited. In this case, the instruction from the interface 27 is supplied to the CPU 17, and the ordinary character broadcast program in the program ROM 19 may be decoded using the program or data for decoding to be output into the CRT 26 as a video output.

In the conventional character broadcast program, while the character information and other data used to display this character information (hereinafter referred to as data for display), for example, color instruction of an image surface background, character size instruction, etc., are simultaneously transmitted, most parts of the data for display, the transmitted character broadcast signal and the program for properly controlling the data for display may be in the ROM area 20b for a specific program. As a result, since only character information is transmitted for the specific program, the transmission efficiency can be improved. In other words, incomplete data or a program can be transmitted. Also in this case, the identification code of the specified program is stored in the ROM area 20b, and this is compared with the identification code of the program data stored in the buffer memory 16. And when both of them are coincident with each other, the program in the ROM area 20b may be initiated.

In this embodiment, the program and data (decoding information) needed to demodulate the specified coded (or incomplete) program data are stored in the ROM area of the magneto-optical disc beforehand, so that the use of the character broadcast program may be limited only to a specified user having such a program and data (decoding information) on a disc. Therefore, the charge can individually be made for a specific character broadcast by selling the magneto-optical disc at a price including the use rate of the broadcast program. Thus, the charge can individually be made for the respective groups of information transmitted to a large number of unspecified users, and a finer charge for information is rendered possible. For example, the charge can be made in accordance with a use value of information. In the above embodiments, the character program data is coded and transmitted, but such a system in which a series of information groups is incomplete may be adopted. In this case, the program is provided only to a specified user by performing the demodulation using a program and data in a similar manner.

As described in the foregoing, according to the present invention, a program or data for demodulating coded or incomplete information groups is stored in advance in an information recording medium. Therefore, the information can be provided only to a user having such a recording medium, thereby enabling individual distribution of the respective information groups.

The individual components shown in outline or designated by blocks in the drawings are all well-known in the information processing arts and their specific construction and operation are not critical to the operation or best mode for carrying out the invention.

While there have been shown and described what are considered preferred embodiments of the present invention, it will be understood to those skilled in the art that various changes and modifications may be made therein without departing from the invention as defined by the following claims.

What is claimed is:

1. An information processing system comprising:

receiving means for receiving transmitted information, the information being coded or incomplete and in a non-usable form;

a self-contained recording medium, decoding information needed to demodulate the received information being pre-recorded on said self-contained recording medium, said self-contained recording medium having a first area in which the received information is to be written and a second area in which the decoding information is pre-recorded;

writing means for writing the information received by said receiving means in the first area of said recording medium, the received information remaining coded or incomplete and in a non-usable form;

reading means for reading out the pre-recorded decoding information from said recording medium; and demodulating means for converting the information received by said receiving means to a usable form using the pre-recorded decoding information read out by said reading means.

2. An information processing system according to claim 1, wherein said recording medium comprises an optical disc and the decoding information is recorded in said optical disc in a form of pits having an uneven structure.

3. An information processing system according to claim 1, wherein a first identification code is included in the received information and a second identification code is recorded in said recording medium, and further comprising comparison means for comparing the first identification code of the information received by said receiving means with the second identification code recorded in said recording medium and instruction means for instructing said demodulating means to start the demodulation of the received information when the first identification code coincides with the second identification code in said comparison means.

4. An information processing system according to claim 1, further comprising a storage area in which received information, in a decoded and a usable form, is to be recorded.

5. An information processing method comprising the steps of:

provTranscribing a self-contained recording medium having pre-recorded decoding information needed to demodulate coded or incomplete information, which is in a non-usable form, the decoding information being pre-recorded in a first area of the recording medium;

receiving transmitted information, the received information being coded or incomplete and in a non-usable form;

reading out the pre-recorded decoding information from the first area of the self-contained recording medium;

writing the received information still being coded or incomplete and in a non-usable form onto a second area of the self-contained recording medium; and demodulating the received information by using the read out pre-recorded decoding information to convert the received information to a usable form.

6. An information processing method according to claim 5, further comprising a step of comparing a first identification code included in the received information with a second identification code recorded in the recording medium and wherein the demodulation of the received information is started when the first identification code coincides with the second identification code in said comparing step.

7. A method of distributing information, said method comprising the steps of:

transmitting a plurality of groups of information to a plurality of users, the groups of information being respectively coded in different code systems and being in a non-usable form;

distributing a plurality of kinds of disks respectively corresponding to the plurality of groups of information, decoding information needed to demodulate the respective groups of information being respectively pre-recorded in the plurality of kinds of disks;

writing the plurality of groups of transmitted information in the non-usable form on respective disks of the plurality of kinds of disks;

reading out the pre-recorded decoding information recorded in one of the disks; and demodulating the group of information corresponding to the one disk by using the read out pre-recorded decoding information to convert the group of information to a usable form.

8. An information processing system comprising:

a host computer, said host computer providing coded or incomplete software in a non-usable form;

a first modem for transmitting the coded or incomplete software provided by said host computer through a telephone line;

a second modem for receiving the coded or incomplete software transmitted through the telephone line;

a self-contained recording medium, decoding information needed to demodulate the coded or incomplete software being pre-recorded on said self-contained recording medium, said recording medium having a first area in which the software is to be written and a second area in which the decoding information is pre-recorded;

a driving unit for reading out the pre-recorded decoding information from said self-contained recording medium, said driving unit writing the software received by said second modem in the first area of said self-contained recording medium, the received software still being coded or incomplete and in a non-usable form; and a personal computer for demodulating the software received by said second modem by using the pre-recorded decoding information read out by said driving unit to convert the software to a usable form.

9. An information processing system according to claim 8, wherein said recording medium comprises an optical disc and the decoding information is recorded in said optical disc in a form of pits having an uneven structure.

10. An information processing method comprising the steps of:

receiving coded or incomplete software transmitted in a non-usable form from a host computer through a telephone line;

reading out pre-recorded decoding information needed to demodulate the coded or incomplete software from a first area of a self-contained recording medium;

writing the received software still being coded or incomplete and in the non-usable form in a second area of the self-contained recording medium; and demodulating the received software by using the read out pre-recorded decoding information to convert the received software to a usable form.

11. A system for receiving a coded or incomplete broadcast signal, said system comprising:

a receiving circuit for receiving a coded or incomplete broadcast signal in a non-usable form;

a self-contained recording medium, software needed to demodulate the coded or incomplete broadcast signal being pre-recorded in said self-contained recording medium, said recording medium having a first area in which the broadcast signal is to be written and a second area in which the software is pre-recorded;

a driving unit for reading out the pre-recorded software from said self-contained recording medium, said driving unit writing the broadcast signal received by said receiving circuit in the first area of said self-contained recording medium, the broadcast signal still being coded or incomplete and in a non-usable form; and a processing circuit for demodulating the broadcast signal received by said receiving circuit by using the pre-recorded software read out by said driving unit to transform the coded or incomplete broadcast signal to a usable form.

12. A system according to claim 11, wherein the broadcast signal comprises a character broadcast signal, and the software comprises a program for transforming coded character codes into normal character codes or character code data.

13. A system according to claim 11, wherein said recording medium comprises an optical disc and the software is recorded in said optical disc in a form of pits having an uneven structure.

14. A system according to claim 11, wherein a first identification code is included is the broadcast signal and a second identification code is recorded in said recording medium, and further comprising a comparison circuit for comparing said first identification code of the broadcast signal received by said receiving circuit with said second identification code recorded in said recording medium and an instruction circuit for instructing said processing circuit to start the demodulation of the information when the first identification code coincides with the second identification code in said comparison circuit.

15. A method for receiving a coded or incomplete broadcast signal, said method comprising the steps of:

receiving a coded or incomplete broadcast signal in a non-usable form;

reading out pre-recorded software needed to demodulate the coded or incomplete broadcast signal from a first area of a self-contained recording medium;

writing the received broadcast signal still being coded or incomplete and in the non-usable form in a second area of the self-contained recording medium; and demodulating the received broadcast signal by using the read out pre-recorded software to convert the coded broadcast signal to a usable form.

16. A method according to claim 15, further comprising a step of comparing a first identification code included in the broadcast signal with a second identification code recorded in the recording medium, and wherein the demodulation of the broadcast signal is started when the first identification code coincides with the second identification code in said comparison step.

17. An information processing system comprising:

receiving means for receiving transmitted information, the information being coded or incomplete and in a non-usable form;

a disk, decoding information needed to demodulate the received information being pre-recorded on said disk;

writing means for writing the received information in the non-usable form on said disk;

reading means for reading out the pre-recorded decoding information from said disk; and demodulating means for converting the pre-recorded information received by said receiving means to a usable form using the pre-recorded decoding information read out by said reading means.

18. An information processing system comprising:

a host computer, said host computer providing coded or incomplete software in a non-usable form;

a first modem for transmitting the software provided by said host computer through a telephone line;

a second modem for receiving the coded or incomplete software transmitted through the telephone line in the non-usable form;

a disk, decoding information needed to demodulate the coded or incomplete software being pre-recorded on said disk in the non-usable form;

writing means for writing the received software on said disk in the non-usable form;

a driving unit for reading out the pre-recorded decoding information from said disk; and a personal computer for demodulating the software received by said second modem by using the pre-recorded decoding information read out by said driving unit to convert the software to a usable form.

19. A system for receiving a coded or incomplete broadcast signal in a non-usable form, said system comprising:

a receiving circuit for receiving a coded or incomplete broadcast signal in a non-usable form;

a disk, software needed to demodulate the coded or incomplete broadcast signal being pre-recorded in said disk;

writing means for writing the received broadcast signal on said disk, in the non-usable form;

a driving unit for reading out the pre-recorded software from said disk; and a processing circuit for demodulating the broadcast signal received by said receiving circuit by using the pre-recorded software read out by said driving unit to transform the coded broadcast signal to a usable form.

* * * * *